Jan. 19, 1943.    C. M. EASON    2,308,680
CLUTCH CONTROL MECHANISM
Filed July 3, 1939    4 Sheets-Sheet 1

Inventor:
Clarence M. Eason
By Brown Jackson Boettcher Dienner
Attys

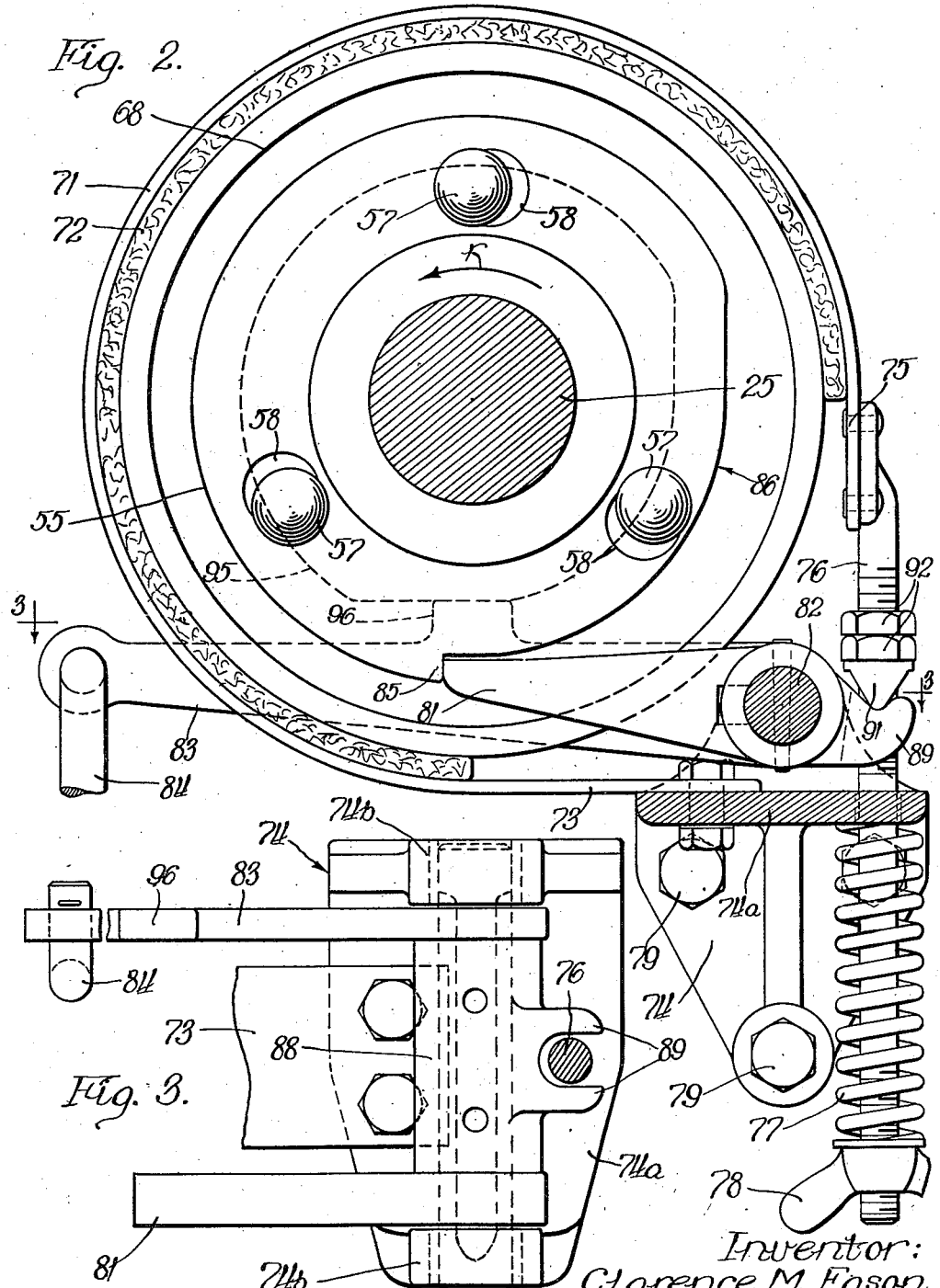

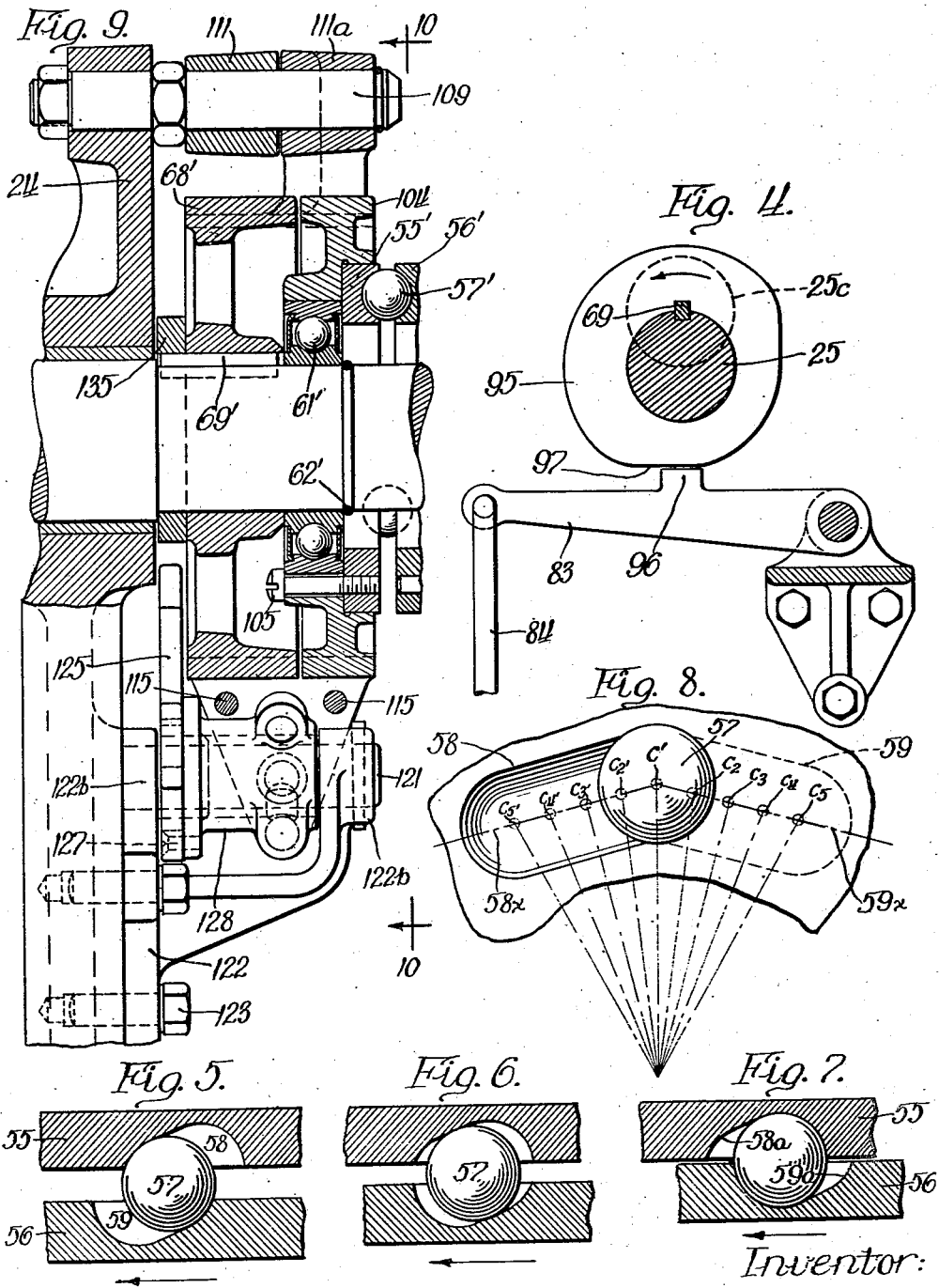

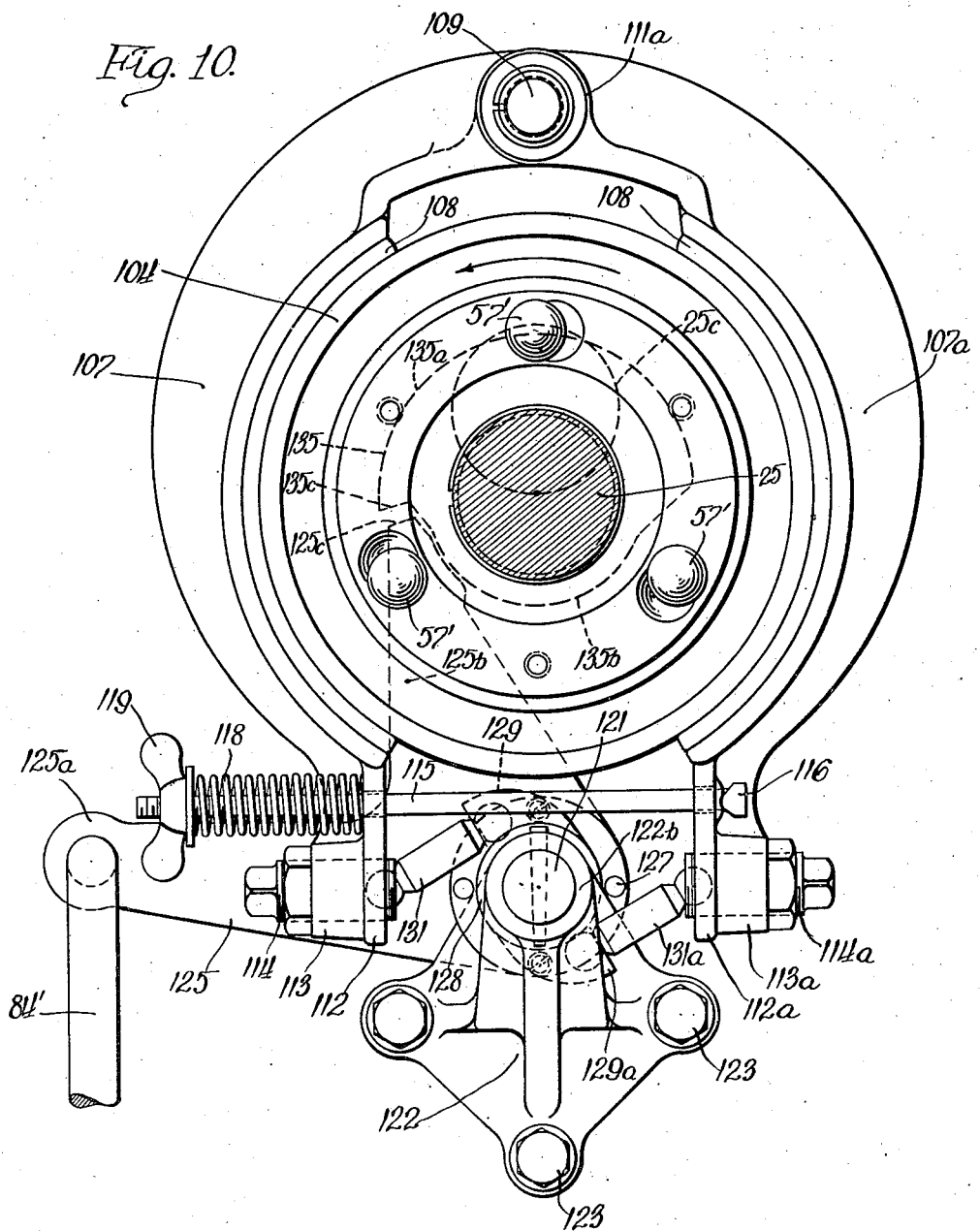

UNITED STATES PATENT OFFICE 2,308,680

CLUTCH CONTROL MECHANISM

Clarence M. Eason, Waukesha, Wis.

Application July 3, 1939, Serial No. 282,588

33 Claims. (Cl. 192—17)

The present invention relates to clutch control mechanism, and particularly to control mechanism of the general type which first manually engages the clutch as a result of a manual tripping operation, and which thereafter automatically disengages the clutch as the result of an automatic releasing operation, this occurring after a predetermined degree of rotation, such as at the end of one revolution of the clutch. This type of mechanism is sometimes referred to as a one-cycle stop mechanism, in that the driven element moves through one cycle, such as one revolution, and is then automatically brought to a stop. Such type of clutch control mechanism is extensively used in connection with punch presses where the operator steps on a foot treadle to cause engagement of the clutch, following which the clutch is automatically disengaged at the end of one revolution.

There has been considerable activity recently in development work on friction clutches for intermittently operating heavy duty punch presses. It has long been recognized that a friction clutch possesses definite operating advantages over a jaw or pin clutch for this type of punch press use, particularly from the standpoint of reduced shock at time of engagement, reduced wear of clutch surfaces, etc. However, the likelihood of an objectionable amount of slippage in the friction clutch, together with the problems of control, have militated against the successful use of practically all prior friction clutches in these heavy duty, intermittently operating punch presses.

In my copending application, Serial No. 185,679, filed January 19, 1938, Patent No. 2,268,578, Jan. 6, 1942, and in my later copending application Serial No. 279,899, filed June 19, 1939, I have illustrated friction clutches for punch presses wherein heavy engaging pressures are established between the clutch surfaces by a helical spline type of servo mechanism in the one instance, and by a toggle strut type of servo mechanism in the other instance. These servo mechanisms prevent slippage of the clutch by imposing an extremely high pressure upon the clutch surfaces at the instant of maximum torque, i. e., at the instant of impact of the movable die with the work.

The present clutch control mechanism herein disclosed has been developed primarily for use with these friction clutches on intermittently operating heavy-duty punch presses. However, the field of utility of the invention is not necessarily limited to punch presses, but may be extended to other situations where the clutch is intermittently tripped to engaged position and is then automatically restored to disengaged position after a predetermined degree of rotation.

In this regard, one of the objects of the present invention is to provide improved control mechanism for effecting the above described one-cycle stop control of a servo type of friction clutch.

In connection with the function of accurately stopping the rotation of the crank shaft substantially at the point where the ram of the press is at the top of its stroke, one prevalent practice heretofore followed has been to mount a brake drum on the crank shaft, and to have a spring-actuated brake band drag continuously on this brake drum with sufficient frictional drag to stop the inertia of the crank shaft, ram, die, etc., substantially immediately upon the disengagement of the clutch. Obviously, this continuously dragging brake band dissipates a large amount of energy over a long period of operation of the press.

In this regard, one of the objects of the invention is to provide improved clutch control mechanism of the above general description embodying brake apparatus which is released automatically substantially at the instant that the clutch is engaged, and which is then reengaged automatically substantially at the instant that the clutch is disengaged. This improved operation of the brake apparatus avoids substantially all of the energy loss of the conventional dragging brake band during the power stroke of the ram.

Another important factor in connection with clutch control mechanisms for punch presses is the amount of pedal pressure which must be exerted by the operator on the tripping pedal for tripping the control mechanism. Many of these presses are operated hundreds or thousands of times each day, and it is therefore very advantageous to have a relatively light pedal pressure.

In this regard, one of the objects of the invention is to provide improved control mechanism for effecting the above described one-cycle stop control of a spring-loaded type of friction clutch. Such spring-loaded type of clutch does not require the expenditure of any energy on the part of the operator to effect the engagement of the clutch surfaces. Immediately upon tripping the control mechanism for engaging the clutch, these loading springs effect initial engagement between the clutch surfaces, following which the servo mechanism increases the pressure of engagement between said surfaces in proportion to the torque transmitted.

Another object of the invention is to provide improved control mechanism in combination with a spring loaded friction clutch in which the loading springs react rotatively with respect to the clutch structure. That is to say, these loading springs are so arranged in the clutch structure that they tend to revolve one of the clutch parts in a forward direction, and tend to revolve the crank shaft or other driven rotary member in a rearward direction. In the automatic operation of disengaging the clutch and stopping the rotation of the crank shaft, the inertia of the crank shaft and its connected moving parts functions to compress these springs, thereby loading or storing energy in them. During the normal, non-driving condition of the clutch, the trip apparatus prevents forward rotation of that clutch part which these springs tend to revolve forwardly, and the brake apparatus prevents rearward rotation of the crank shaft which these springs tend to revolve rearwardly. Hence, the springs normally stand in a loaded or cocked condition in the clutch structure, ready to effect engagement of the clutch instantly upon the performance of the tripping operation, the latter thus becoming substantially a mere trigger operation. The small effort involved in this trigger operation minimizes operator's fatigue, and the instant engagement of the clutch also serves to speed up the operation of the punch press by avoiding the delay of waiting an indeterminate period for the clutch to engage, as is true in the case of jaw and pin clutches.

Another object of the invention is to provide improved clutch control mechanism of the above general description in which the clutch releasing forces are distributed at a plurality of angularly spaced points so that no lateral or radial load is thrown on the parts by the clutch releasing operation.

Another object of the invention is to provide improved clutch control mechanism of the above general description in which ball-cam apparatus is employed to create the axial pressure which moves the shiftable clutch element out of engagement with the other clutch element. This ball-cam apparatus distributes the clutch releasing forces at a plurality of angularly spaced points, in the manner above mentioned. In addition, this ball-cam apparatus has the extremely low friction typical of an anti-friction ball bearing, which is particularly advantageous during the clutch releasing and clutch engaging operations. Another object of the invention is to provide improved clutch control mechanism of the above general description which can be located on the crank shaft between the flywheel and the frame of the punch press. This location of the operating mechanism enables the frame to support associated operating parts and to take reaction pressures incident to the operation of the clutch; and also avoids the necessity of employing any overhanging or outboard parts at the outer end of the crank shaft beyond the flywheel.

Other objects, features and advantages of the invention will appear from the following detailed description of different preferred embodiments thereof. In the accompanying drawings illustrating these embodiments:

Figure 2 is a transverse sectional view taken approximately on the plane of the line 2—2 of Figure 1;

Figure 3 is a horizontal detail section taken approximately on the plane of the line 3—3 of Figure 2;

Figure 4 is a transverse sectional view on a smaller scale, taken approximately on the plane of the line 4—4 of Figure 1;

Figures 5, 6 and 7 are sectional diagrams showing different positions of the two ball-cam clutch actuating members;

Figure 8 is a diagram illustrating the operating relation of this ball-cam apparatus when the cam pockets are formed along straight chord lines of the cam rings;

Figure 9 is a fragmentary longitudinal sectional view of a modified construction of clutch control mechanism; and Figure 10 is a transverse sectional view, taken approximately on the plane of the line 10—10 of Figure 9.

Figure 1:
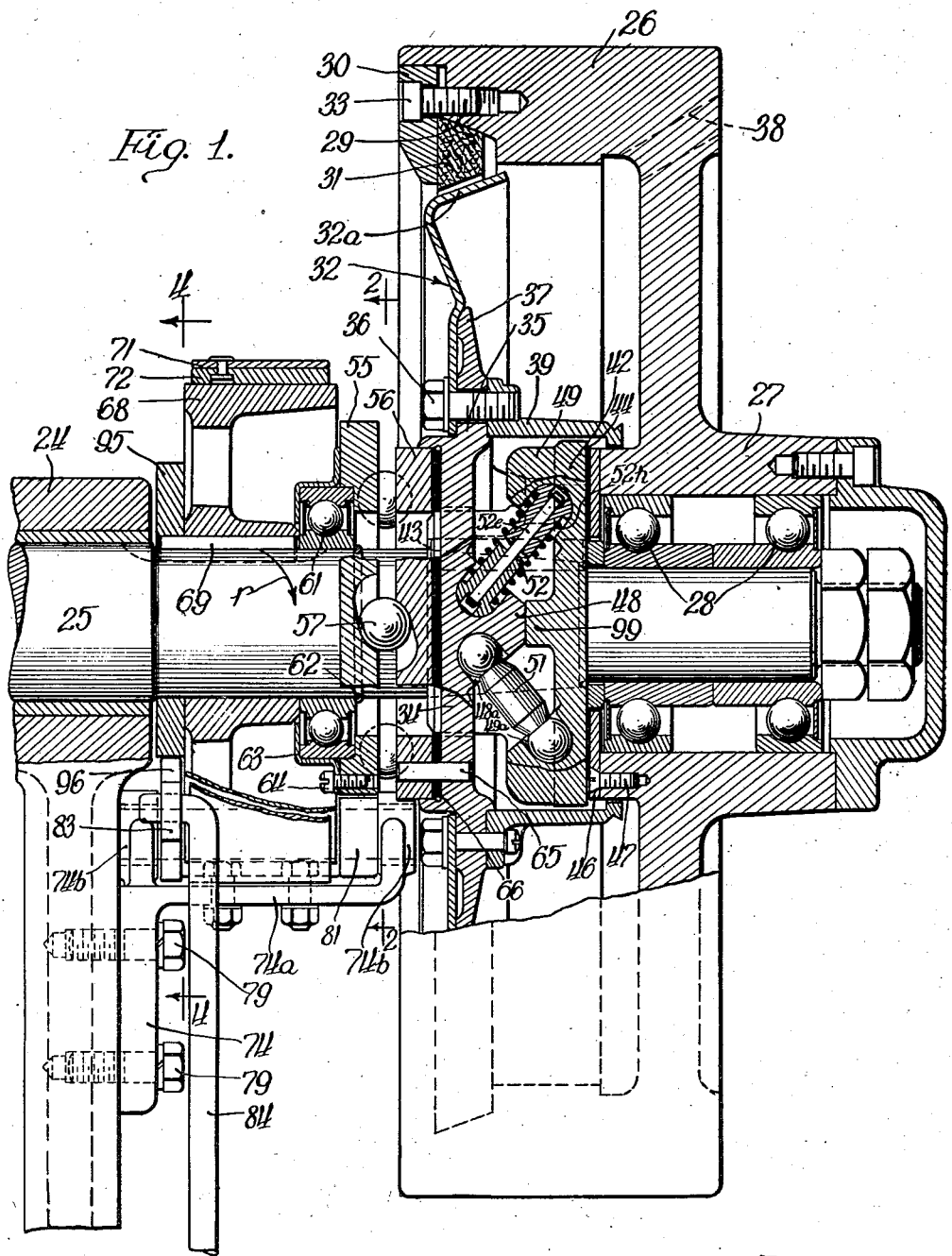
Figure 1 is a longitudinal sectional view through one form of the invention, certain of the operating parts being illustrated in a section plane or planes disposed forwardly of the axial plane, for facility of disclosure.

Referring first to Figure 1, the adjacent side portion and end bearing of the punch press is indicated fragmentarily at 24, the crank shaft is indicated at 25, and the flywheel, belt wheel, bull gear or other driving element is indicated at 26. The hub portion 27 of said belt wheel or flywheel is journaled on the reduced outer end of the crank shaft 25 through the medium of thrust resisting anti-friction bearings 28. The driving element of the clutch comprises a female cone member 31 which is secured to the belt wheel 26. The driven element of the clutch comprises a coacting male cone 32a, this being shiftable axially for effecting clutch engagement with the non-shiftable female cone 31. The shiftable male cone is one part of an assembly which makes up the shiftable clutch element, and which I have designated 32 in its entirety. The driving female cone 31 may be of conventional construction substantially as illustrated in my copending application Serial No. 279,899. However, as an alternative construction which is particularly adaptable to relatively high speed presses, I have shown a modified construction in which this female cone consists of a ring or length of V-belt or the like. This V-belt material comes in a wide variety of sections, sizes and compositions, the conventional grade of belting of this type being composed of fabric and rubber. Such material affords a compressible resilient friction element which very satisfactorily meets the requirements of the clutch surface or clutch lining. The section 31 may be a continuous ring specially prepared for clutch use; or it may consist of stock belting, either in the form of a short loop turned sidewise, or of a cut length with its ends joined together or merely placed in abutment with each other. This section of material is seated in a tapering recess 29 which slopes at an angle corresponding substantially to the slope of the belting section. The taper of the male cone 32a also corresponds substantially with the taper of the belting section. An adjustable confining ring 30 acts in compression against the outer surface of the section 31. Screws 33 pass through this compression ring and tap into threaded bores in the driving element 26. As wear occurs along the inner surface of the belting section 31, the screws 33 can be advanced inwardly for forcing the belting section deeper into the tapered recess 29, thereby compressing the section to a smaller outer dimension and restoring the inner surface to its former dimension. In this manner, successive compressions of the section may be made as wear occurs, thereby resulting in a frictional gripping surface of very long life. Because of the rubber or resilient constituency of the belting, and the relatively deep section thereof, it is inherently deformable or yieldable to the extent that it will release overload torque of an injurious degree by permitting sufficient slippage to prevent such torque from breaking the clutch or press. The compression adjustment effected by the ring 30 can be utilized for adjusting the point of overload torque slip.

The shiftable clutch element 32 comprises a central hub structure 34 having a radially extending flange 35 to which is secured the central portion of the driven cone 32a by the cap screws 36 passing through the web portion of said cone and through said flange. Where the shiftable cone 32a is constructed of sheet metal, as shown, a reinforcing or backing portion 37 may be extended from the flange 35 to reinforce the sheet metal cone. The outer portion of the cone has an appreciable resiliency for easing the engagement of the clutch, accommodating eccentricity or misalignment, etc. If desired, this sheet metal cone portion may be slotted longitudinally; or the cone portion and the inwardly extending web portion may be divided into segmental portions so as to facilitate removal of the cone sections, if desired. Openings 38 leading diagonally outwardly through the peripheral portion of the driving element 26 serve to conduct a cooling flow of air past the clutch surfaces, and also serve to discharge any excess lubricant or other foreign matter which might tend to collect within the rim of the driving element. The shiftable clutch assembly also includes a laterally projecting enclosing ring 39 which partially houses the servo struts and the spring struts to be hereinafter described, this ring having a radially extending flange which abuts the flange 35 and which is secured thereto by the cap screws 36.

Embraced within the hub structure 34 and housing ring 39 is the thrust reaction member 42 which receives the thrust reaction of the toggle struts and establishes the torque transmitting connection between the shiftable clutch element and the crank shaft 25. Said member 42 is rigidly anchored to the shaft 25 by a drive key 43 and by a tight fit on a tapered portion of said shaft, although it will be understood that a splined connection may be employed in lieu thereof, if desired. The radially extending flange 44 at the outer end of the member 42 abuts against a thrust ring 46 which is secured to the hub 27 of the driving element 26 by the screws 47. Thus, the thrust reaction incident to the axial movement of the shiftable clutch element 32 into engagement with the non-shiftable clutch element 31 is transmitted back through the thrust plate 46 and through the hub 27 and outer rim of the driving element 26 to the non-shiftable clutch element 31. The forces set up in the operation of releasing the clutch are transmitted through the thrust plate 46, hub 27, and thrust bearings 28 to the shaft 25.

In the preferred construction illustrated, the toggle strut type of servo mechanism is employed, such as is illustrated in my copending application Serial No. 279,899, although it will be understood that the present invention is not limited to this particular clutch structure or form of servo mechanism. The strut type of servo mechanism is illustrated in complete detail in my copending application above mentioned and, accordingly, I have made only a schematic illustration thereof in the present drawings. Briefly describing this strut apparatus, it will be seen that the shiftable member 32 is formed with a plurality of lugs or bosses 48 which project laterally toward the right, and that the thrust reaction member 42 is formed with a plurality of lugs or bosses 49 which project laterally toward the left, the lugs or bosses of one member alternating or extending into the spaces between the lugs or bosses of the other member around the peripheries of these members. Interposed between these alternating bosses are the driving toggle struts 51 and the spring toggle struts 52. The driving struts 51 are solid, fixed-length steel units somewhat resembling dumb-bells, the spherical end heads being relatively large and being accurately machined and ground for sustaining high compressive thrust loads through said end heads with minimum friction. These spherical end heads engage respectively within the spherical sockets 48a and 49a formed, respectively, within the boss 48 and the boss 49. These sockets are accurately machined and ground, and are preferably of a slightly larger radius than the ball ends of the struts. The reverse driving, spring toggle struts 52 each comprise the two separate shank portions having semi-spherical heads at their outer ends. The two strut sections are both slidable along an axial pin 52e, the ends of which carry suitable stop rings which have snap engagement within annular grooves formed in the axial pin. These stop rings play within outer counterbores in the two strut sections, thereby limiting outward extensibility of the strut. A relatively heavy compression spring 52h encircles the struts and has its ends abutting the annular shoulders defined by the undersides of the semi-spherical end heads. The latter end heads have rockable bearing mounting within the spherical sockets 48b and 49b which are accurately machined and ground within the bosses 48 and 49, respectively.

There are preferably three pairs of such driving and spring struts 51 and 52 spaced equidistantly about the periphery of the shiftable clutch member 32 and thrust reaction member 42. Of course, any desired number of pairs may be employed, but three pairs afford a three-point application of the spring pressure and also of the servo pressure. In this regard, my invention contemplates either a construction in which the shifting and rotating movement of the shiftable clutch member 32, incident to clutch engagement and release, occurs on a bearing surface afforded by the hub of the thrust reaction member 42, or other equivalent bearing surface, or, in the alternative, where this shifting and rotating movement occurs as a floating motion on the struts so that rocking, tilting, radial displacement or a veritable universal joint action is permitted for enabling most effective coaction between the driving and driven cones.

The helical angle of each strut is an angular relation of the strut with respect to the axial line of the clutch. The forward driving struts 51 are all inclined at the same common angle with respect to this axial line, and the reverse driving spring struts 52 are all reversely or oppositely inclined at the same common angle with respect to this axial line. In the embodiment illustrated, this angular inclination is of substantially the same degree for both sets of struts, although the two sets may be disposed at considerably different angles, if desired. The degree of engaging pressure ultimately established in the clutch by the servo action of the struts can be proportioned as desired by varying the angular inclination of these struts. For example, as the angle of inclination of the struts 51 is made to approach the plane of rotation the servo action diminishes, and as the angle of inclination is made to approach the axial plane the servo action increases.

With reference to the spring struts 52, the springs on these struts function as the loading springs which normally tend to force the shiftable clutch element 32 into engagement with the non-shiftable clutch element 31. It will be observed that by virtue of their inclined positions, these spring struts impart an axial component and a rotating component to the shiftable clutch element. The axial component is further supplemented by the toggle action of the driving struts 51. The normal direction of rotation of the clutch and crank shaft is indicated by the arrow r. It will be noted that the spring struts tend to produce relative rotation between the driven clutch element 32 and the thrust reaction member 42 in opposite directions, i. e., they tend to rotate the driven clutch element in the forward direction of rotation r and, at the same time, tend to rotate the thrust reaction member 42 and the connected crank shaft 25 in the reverse direction of rotation. It is the compression springs on these spring struts 52 that are placed in a loaded or cocked condition by the inertia of the crank shaft and its connected parts when the clutch is disengaged, and which normally stand ready to effect engagement of the clutch instantly upon the tripping operation. As fully described in my copending application, Serial No. 279,899, these spring struts can also function as reverse drive struts. It is frequently desirable to be able to back up the press ram during the operation of changing or setting the dies, or freeing the movable die from a jammed condition in the work, and such can be readily accomplished, in my improved construction, by the action of the spring struts 52 contracting to a solid condition when the relative rotation between the clutch member 32 and thrust reaction member 42 is in a direction tending to compress each strut 52.

The clutch control mechanism is mounted on the crank shaft 25 at a point between the frame 24 of the press and the above described clutch structure. This control mechanism comprises the two circular cam plates or clutch actuators 55 and 56 between which are disposed balls 57. As shown in Figures 5–7, the opposing faces of the two cam plates are formed with coacting runways 58 and 59 for each of the balls 57. The two cam plates or clutch actuators 55, 56 are capable of relative rotation, and such relative rotation operates through the balls and sloping runways 58, 59 to create a spreading or separating pressure between the cam rings for holding the shiftable clutch element 32 in its disengaged position. The cam ring 55 is capable of rotary movement but is fixed against axial shifting movement, whereas the cam ring 56 is capable of both rotary and shifting movement. The non-shiftable thrust ring 55 has an annular recess in its outer surface which is mounted on a thrust sustaining anti-friction bearing 61 mounted on the crank shaft 25. The inner race of said bearing has thrust abutment against the end of the hub of the brake drum, to be later described, and this inner race is held against outward displacement by a snap type of confining ring 62 which snaps into an annular groove in the shaft 25 disposed at the outer side of the bearing race. A sheet metal cup 63 is secured to the side of the clutch actuating ring 55 by the screws 64, this cup embracing the outer race of the bearing 61, thereby securing the actuating ring thereto. The mounting of said ring on the bearing 61 insures that the ring 55 will offer minimum frictional resistance against rotation under the influence of the clutch spring studs 52.

The other cam ring 56, which is adapted for shifting as well as rotating movement, has pinned connection with the shiftable clutch element 32 through the dowel pins 65, thereby compelling concurrent angular movement between the shiftable clutch element and the shiftable cam ring. A plurality of spacing shims 66 are interposed between the outer face of the cam ring 56 and the adjacent inner face of the shiftable clutch element 32, whereby the addition or removal of these shims effects a spacing adjustment for accommodating wear of the clutch element 31 or other clutch lining.

Also mounted on the crank shaft as a part of the clutch control mechanism is a brake drum 68, the hub of which is rigidly secured to the shaft, as by the key 69. A brake band or snubbing band 71 encircles this brake drum, the band having any suitable brake lining material 72 for engaging the drum. One end 73 of the brake band is rigidly anchored to a stationary bracket 74, and the other end 75 of the band has a continuous spring tension acting thereon through the medium of a plunger rod 76 on which a compression spring 77 acts, this plunger rod exerting a continuous tension tending to draw the band tightly about the drum. The direction of rotation is indicated in this figure by the arrow r, and the ends 73, 75 of the brake band are so related to this direction of rotation that normal forward motion in this direction tends to release the snubbing or braking action of the band, but motion in the reverse direction immediately receives the full force of the snubbing action for preventing such motion. The tension rod 76 passes downwardly through an aperture formed in the laterally extending shelf portion 74a of the bracket 74, and the compression spring 77 is mounted on the rod below this bracket portion. A wing nut 78 screws over the threaded lower end of the rod 76 and serves to adjust the pressure of the spring 77. The bracket 74 is rigidly secured to the side of the press frame by the bolts or screws 79.

The engagement of the clutch is effected by the tripping of a releasable stop arm or sprag 81. This stop arm is secured to a rock shaft 82, to which is also secured the tripping lever 83, a link 84 extending from said tripping lever to the control pedal by which the operator trips the control mechanism. The nose of the stop arm or latch 81 is adapted to abut against the right-angle stop shoulder 85 which is formed in the non-shiftable cam plate 55. A gradual track or slope 86 leads from the periphery of the cam plate inwardly to the bottom end of the stop shoulder 85. Referring to Figure 3, the ends of the rock shaft 82 are journaled in bearing bosses 74b—74b projecting upwardly from the ends of the bracket shelf portion 74a.

The operation of tripping the latch or stop arm 81 is also operative to automatically release the tension on the brake band 71. As shown in Figure 3, the rock shaft 82 has a hub portion 88 pinned thereto between the latch 81 and lever 83, this hub portion being formed with a laterally projecting fork or yoke 89 which embraces the tension rod 76. Vertically slidable on the rod 76 is a crossbar 91 having downwardly extending wedge-shaped formations at the outer ends of said bar (Figure 2). These wedge-shaped formations seat in V-shaped sockets formed in the upper surfaces of the yoke arms 89. Adjusting nuts 92 screw over the threaded upper portion of the rod 76 and enable the position of the crossbar 91 to be adjusted along the length of the rod. Accordingly, it will be seen that when the lever 83 is rocked downwardly to trip the latch arm 81 from out of engagement with the stop shoulder 85 on the cam plate, the simultaneous upward swinging motion of the fork or yoke 89 will lift the tension rod 76 and take the spring tension off the brake band 71.

In the ordinary intermittent operation of the press, the foot treadle is usually released instantly after a tripping operation, and this would allow the brake band 71 to reengage the brake drum 68 immediately unless some means is effective for holding the tension rod 76 in this raised, brake releasing position. This function might be performed by having the latch arm 81 ride continuously on the outer periphery of the cam plate 55 for holding the rod 76 in its raised position. However, this would impose a frictional retarding force on the cam plate 55, which is undesirable because it is preferable to minimize any resistance to rotation of the cam plate, until the tripping latch 81 is engaged by the stop shoulder 85 at the completion of the one-cycle stop motion. Accordingly, I provide a second cam 95 which is rigidly secured to the shaft 25 by the driving key 69, and which is adapted to cooperate with a cam follower lug 96 projecting upwardly from the tripping lever 83. As shown in Figure 4, the cam 95 has a recessed or low span 97 which normally registers with the follower lug 96 when the clutch is in its disengaged condition. Immediately following the tripping operation which releases the latch 81 from the stop shoulder 85, the follower lug 96 moves back into engagement with the raised dwell portion of the cam 95, thereby holding the tension rod 76 in raised position for taking the tension off the brake band, and also holding the trip latch 81 in a depressed position, out of contact with the periphery of the cam plate 55. Thus, no rotative resistance is active on the cam plate. As the crank shaft 25 nears the end of its one revolution, the follower lug 96 follows inwardly along the inner cam dwell 97, thereby lowering the tension rod 76 to restore tension to the brake band 71, and also bringing the stop latch 81 back into the path of movement of the stop shoulder 85. If desired, the cam 95 may be so designed as to retain the stop latch 81 out of physical contact with the cam plate 55 at all times except when it is being engaged by the stop shoulder 85.

Referring to Figures 5 to 8, inclusive, each cam pocket or runway 58—59 may be of arcuate formation or of chordal formation, i. e., its lengthwise dimension may be along a curve or arcuate line which is substantially concentric with respect to the center of its respective cam plate, or this lengthwise dimension may be along a straight line which occupies the relation of a chord with respect to the center of said cam plate. The chordal formation is decidedly less expensive to machine than the arcuate formation, and is entirely satisfactory in operation, at least in situations where the pockets are of relatively short length, comparable to the lengths of pockets used in the present construction. Figure 8 is a diagram for the purpose of illustrating the operating relation of two coacting pockets of chordal formation, these being shown of a length which is exaggerated beyond the requirements of the present clutch control mechanism in order to illustrate these pockets or runways to better advantage. By reason of the fact that the two chordal lines 58x and 59x intercept the same arcuate measure on a common circle, and rotate on a common center, it follows that these lines will always have points or centers C2—C2', C3—C3', C4—C4', and C5—C5' which coincide at a point equidistant from either end of their respective pockets. In cross-sectional dimension, each of these pockets or cam grooves is preferably of a radius which is approximately 5% larger than the radius of the balls.

Referring to Figures 5–7, the depth of each pocket at its shallow end 58a—59a is preferably so proportioned with respect to the diameter of the ball 57 that when the ball is in the shallow ends of the pockets, as shown in Figure 5, the degree of separating or spreading action which has taken place between the two cam rings 55—56 is approximately 30% of the ball diameter. In this preferred construction illustrated in Figures 5–7, the shallow ends 58a and 59a are sufficiently deep to function substantially as positive end stops adapted to coact with diametrically opposite sides of each ball 57 whereby to positively limit relative rotation between the cam rings 55—56 when the rings have moved to the position illustrated in Figure 5. In order to make this positive stop function fully effective at the shallow ends of the pockets, a positive stop relation is established between the shiftable clutch element 32 and any stationary or non-shiftable limiting stop carried by the shaft. For example, the rotary member 42 may be provided with axially extending stops 99 (Fig. 1) adapted to be engaged by the adjacent ends of the bosses 48 on the shiftable clutch element 32.

In the operation of the clutch control mechanism, the tripping of the operator's treadle withdraws the latch arm 81 from engagement with the stop shoulder 85, thereby freeing the cam ring 55 for counterclockwise rotation (Figure 2). Immediately, the two rings 55 and 56 start to run forwardly under the pressure normally maintained in the cocked or loaded spring struts 52. As previously remarked, these spring struts act with a rotative component and also with a shifting component on the ring 56, and such components act through the cam slopes and balls to run the cam ring 55 on ahead to a more advanced position than the ring 56, whereby the balls finally arrive in the deep ends of the two pockets, or adjacent to these deep ends. This operation has permitted the shiftable cam ring 56 to shift axially toward the non-shiftable cam ring 55, as illustrated in Figure 7, in consequence of which the shiftable clutch element 32 has moved into clutching engagement. As soon as initial clutching engagement occurs, all of the driving torque thereafter transmitted through the clutch is transmitted solely through the driving toggle struts 51. As soon as driving torque is imparted to these struts they immediately function with a servo action to increase the pressure of engagement of the shiftable clutch element against the non-shiftable clutch element. Accordingly, torque is transmitted through these servo toggle struts to the crank shaft or other driven rotary member. This rotation of the crank shaft is unimpeded by the brake mechanism 68—72 because this brake mechanism is meanwhile being maintained in a released condition by reason of the follower lug 96 riding on the high surface of the cam 95. As the crank 25c nears the end of its cycle of revolution, the follower lug 96 rides inwardly on the low surface 97 of the cam, thereby gradually restoring the spring pressure to the brake apparatus, and also bringing the latch arm 81 back into position to intercept the stop lug 85. When said stop lug strikes the latch arm 81 the cam ring 55 immediately ceases forward rotation but the other cam ring 56 continues rotation for a brief interval under the driving torque of the clutch. This continued motion of the latter ring results in the aforementioned spreading action between the two rings, as a result of the coaction between the cam pockets and balls, and in consequence thereof the shiftable clutch element 32 is shifted back into its disengaged position. The kinetic energy of the crank shaft and its connected parts, during and following the disengagement of the clutch, is transmitted to and through the spring toggle struts 52 to the clutch element 32 and cam ring 56. Hence, the springs on these spring struts are compressed under the momentum of these moving parts. Upon the absorption of this kinetic energy within the spring struts, the crank shaft comes to rest. The stored energy in the spring struts cannot advance the driven clutch element 32 in a forward direction because of the locked relation established through the ball cam apparatus, and hence this spring energy endeavors to react by rotating the crank shaft 25 in a reverse direction. However, at this time the brake band 71 is fully effective on the brake drum 68, and any such tendency of the brake drum to rotate in a reverse direction is resisted by the full snubbing force of the band. Accordingly, the parts are retained in a locked-up or cocked relation, with the driven clutch element 32 incapable of rotating forwardly and the crank shaft 25 incapable of rotating backwardly, in consequence of which the energy in the spring struts remains stored awaiting the next tripping operation, whereupon this energy is effective to immediately reengage the clutch, for a repetition of the cycle above described. It will be understood that if the punch press operator continues to hold the tripping treadle depressed there will be no automatic disengagement of the clutch at the end of one revolution, but that the clutch will remain engaged until the treadle is released. Following such release, the disengagement of the clutch will always occur when the ram of the press is substantially at its upper dead center position.

The above described construction affords a positive stop against any overrun of the crank shaft through the instrumentality of the arm 81 and stop shoulder 85. This construction is primarily intended for slow or medium speeds, ranging from approximately 40 R. P. M. to 200 R. P. M.

In the modified construction illustrated in Figures 9 and 10, a frictional braking function is substituted for the positive stop function of the above mentioned arm 81 and stop shoulder 85, insofar as controlling the primary cam ring or clutch actuator 55 is concerned. The parts in this new construction which are similar to or identical with those previously described have been identified by the same reference numerals, except that such numerals have been supplemented with a prime mark. That part of the structure including the driving and driven clutch elements remains the same as previously described. The non-shiftable cam ring 55' is seated within an annular recess formed in the outer side of a supplementary brake drum 104, being secured thereto by the screws 105 which pass through this supplementary drum and thread into tapped holes in the cam ring. This secondary brake drum 104 is mounted for free rotation on the crank shaft through the medium of a thrust-sustaining anti-friction bearing 61'. The inner race of this ring abuts at its inner side against the hub of the main brake drum 68', and said race is held against outward displacement by the snap ring 62' engaging within an annular groove in the crank shaft. The main brake drum 68' and the supplementary brake drum 104 are preferably adapted to have braking retardation applied simultaneously thereto, and, accordingly, the two drums are preferably of the same diameter so as to have the same brake band apparatus effective on both drums. As best shown in Figure 10, the brake band apparatus comprises two arcuate bands or shoes 107—107a, which embrace the sides of both drums. The inner surfaces of the shoes carry any conventional brake lining material 108. The two shoes are pivotally supported on an upper pivot stud 109 which is common to both shoes. As shown in Figure 9, the stud 109 is fixedly supported in the press frame 24, above the crank shaft 25, and the two shoes are provided with axially offset hubs 111 and 111a, respectively, which engage over the stud 109. Each shoe may be provided with an outer rib for stiffening the shoe. As shown in Figure 10, the lower end of each shoe carries a downwardly extending lug 112—112a from which protrude threaded bosses 113—113a. Threaded studs or sleeves 114—114a screw through these threaded bosses for establishing a connection with the brake releasing or tripping apparatus, as will be later described. Above the threaded bosses, the lugs 112—112a are apertured for receiving the transversely extending spring rods 115, there preferably being two of these rods disposed side by side. Each rod has a head 116 at one end thereof, said head preferably having rocker edges on its under surface for engaging in V-shaped recesses in the adjacent lug of the brake shoe. A compression spring 118 is assembled over the other end of each rod 115, on the outer side of the brake shoe lug 112, and a wing nut 119 screws over each rod for adjusting the compression of the associated spring 118.

The tripping apparatus comprises a mounting shaft 121 which has its ends supported in the bosses 122b of a bracket 122 secured to the side of the press frame by the bolts 123. Rotatably mounted on the shaft 121 is the bell crank lever 125 comprising the tripping lever arm 125a and the cam follower arm 125b. The tripping arm 125a has operative connection through the link or rod 84' with the operator's tripping treadle. Rigidly secured to the boss portion of the lever 125 by screws or rivets 127 is a rocker member 128. Projecting from diametrically opposite sides of said rocker member are bosses having spherical sockets formed therein, as indicated at 129—129a. The adjacent ends of the threaded studs or sleeves 114—114a have similar spherical sockets formed therein, and extending between the sockets of the rocker member and the sockets of the adjustable threaded studs are the toggle struts 131 and 131a. These struts are very much like the struts 51 of Figure 1, being formed with spherical end heads which seat in the aforementioned spherical sockets. In the position of the parts illustrated in Figure 10, the rocker member 128 is in its brake engaging position, at which time the compression springs 118 hold the brake shoes pressed against both brake drums 68' and 104. When the lever 125 and rocker 128 are actuated in a counterclockwise direction from this position, a thrusting or spreading pressure is exerted through the toggle struts 131—131a to the lower lug portions 112—112a of the two brake shoes, thereby swinging said shoes outwardly to release their braking grip on the two brake drums. The cam follower arm 125b is adapted to cooperate with a cam 135 which is secured to the crank shaft by the key 69'. This cam comprises a raised dwell 135a and a depressed or inner dwell 135b. The leading end of the raised dwell is preferably formed with a right-angle stop shoulder 135c which is adapted to cooperate with the stop nose 125c at the upper end of the cam follower arm 125b. When the cam follower arm rides on the raised cam dwell 135a the lever 125 is held in a position which spreads the lower ends of the two brake shoes, thereby releasing the brake apparatus from both drums. When the follower arm rides off the raised dwell and moves into proximity to or in engagement with the inner dwell 135b, the lower ends of the brake shoes are again drawn together by the compression springs 118 for setting the brake apparatus. This is the normal position of the mechanism. The stop shoulder 135c may be provided in situations where it is desired to provide a positive stop function for preventing any accidental overrunning of the clutch and crank shaft.

In the operation of this embodiment, downward tripping motion exerted through tripping rod 84' oscillates the lever 125 in a counterclockwise direction, thereby spreading the lower ends of the brake shoes through the toggle struts 131—131a. This operation frees the cam ring 55' in the same manner that the tripping of the stop arm 81 of Figure 2 frees the cam ring 55. Accordingly, this cam ring is now at liberty to move forwardly under the action of the loaded springs in the clutch, the shiftable clutch element immediately moving to clutch engaging position, in the same manner as described of the preceding embodiment. With the initial rotation of the crank shaft, the raised dwell 135a of the cam 135 is advanced under the cam follower arm 125b so that when the operator releases the tripping treadle the follower arm 125b is not permitted to move all the way back to its normal position but rides, instead, on the raised dwell and hence keeps the brake shoes spread apart out of braking contact with the two drums 68' and 104. As the crank 25c moves through its lower dead center position and carries on upwardly towards its upper dead center position, the low portion 135b of the cam 135 moves under the follower arm and permits the lever 125 to be restored to normal position, such restoration of the lever being effected either by the springs 118 or by other spring means. The return of said lever permits the lower ends of the brake shoes to be drawn together against the brake drums. The torque effective on the supplementary brake drum 104 is considerably less than that effective on the main brake drum 68', and hence the supplementary brake drum comes to rest rather quickly. This operates through the ball-cam mechanism to move the shiftable clutch element back to the clutch releasing position. The continuous braking drag now being exerted on the main drum 68' quickly brings the crank shaft and its connected parts to rest after the clutch is disengaged. The parts can be so proportioned and adjusted that the crank shaft will come to a stop when the crank portion 25c is substantially in its upper dead center position. The complete stopping of the crank shaft and its connected parts is preferably effected by the braking force exerted on the main brake drum 68'. However, if there should be a tendency for the crank shaft to coast beyond this desired stopping position, the stop shoulder 135c of the cam will come up against the stop end 125c of the cam follower arm, thereby positively stopping further movement of the crank shaft. It will be noted that in the normal position of the parts, the spring struts in the clutch are held in a loaded or energized condition by the inability of the cam ring 55' to rotate forwardly and by the inability of the crank shaft 25 to rotate backwardly, substantially as described of the preceding embodiment. This last described embodiment of my invention is particularly adapted for use on presses running at relatively high speeds, such as from 500 to 1000 R. P. M.

While I have illustrated and described what I regard to be the preferred embodiments of my invention, nevertheless it will be understood that such are merely exemplary, and that numerous modifications and rearrangements may be made therein without departing from the essence of the invention.

For example, my invention is not limited to the constructoin of clutch herein disclosed, but is applicable to other spring-loaded friction clutches of the cone type, disk type, or other types. Also, my invention is not limited to servo clutches because numerous features thereof may be employed advantageously in clutches having no servo action.

I claim:

1. The combination with a clutch, comprising driving and driven clutch elements, of spring means adapted to have clutch actuating energy stored therein and operative to impart said energy as a rotative force to one of said clutch elements for effecting initial engagement of the clutch, servo mechanism for thereafter causing a higher pressure of engagement of the brake means cooperating with said driven element, and control means governing the release of said spring means and automatically operating said brake means.

2. The combination with a clutch comprising driving and driven clutch elements adapted to transmit rotation to a rotary driven member coaxial therewith, said driven clutch element and said rotary driven member being relatively rotatable about their common axis, of spring means adapted to have clutch engaging energy stored therein and operative to impart said energy as a rotative force tending to rotate said driven clutch element in one direction and said rotary driven member in the other direction, control means including friction brake means normally tending to prevent rotation of said driven clutch element in said first direction and normally tending to prevent rotation of said rotary driven member in the latter direction, and manual actuating means for engaging and releasing said friction brake means.

3. The combination with a clutch comprising driving and driven clutch elements, of spring means adapted to impart rotative force to one of said clutch elements in a clutch actuating operation, ball-cam mechanism governing said clutch actuating operation, and friction brake means controlling said ball-cam mechanism.

4. The combination with a clutch comprising driving and driven clutch elements, said driven clutch element being shiftable into and out of engagement wtih said driving clutch element, of spring means adapted to impart rotative force to said driven clutch element in a clutch actuating operation, control means comprising a control member adapted to rotate with said driven clutch element but capable of having its rotation interrupted relatively thereto, said control means governing said clutch actuating operation, and friction brake means for interrupting the rotation of said rotatable control member.

5. The combination with a clutch comprising driving and driven clutch elements, said driven element being axially shiftable into and out of engagement with said driving element, of spring means adapted to have clutch engaging energy stored therein and operative to impart said energy as a rotating and shifting force to said shiftable clutch element for effecting engagement of the clutch, brake means cooperating with said driven element, and one-cycle stop mechanism governing the tripping of said spring means and automatically engaging and releasing said brake means.

6. Clutch mechanism for a press or the like comprising a friction clutch, spring means for effecting initial engagement of the clutch, toggle strut servo mechanism for thereafter causing a higher pressure of engagement of the clutch under the torque of the press, a brake, and control means comprising ball-cam mechanism controlling the operation of the clutch, said control means also comprising mechanism for automatically operating said brake.

7. Clutch mechanism for a press or the like comprising a friction clutch adapted to transmit rotation to a rotary driven member, spring means for effecting initial engagement of the clutch, servo mechanism for thereafter causing a higher pressure of engagement of the clutch under the torque of the press, a controllable brake adapted to act on said rotary driven member, and control mechanism operative to control the operation of said clutch and of said brake substantially concurrently.

8. In apparatus of the class described, the combination of friction clutch mechanism adapted to transmit power to a load, brake mechanism adapted to act on the load, servo means responsive to load torque for securing high pressure engagement of one of said mechanisms, and control means operative to automatically release the brake mechanism when the clutch mechanism is engaged, and to automatically engage said brake mechanism when the clutch mechanism is released.

9. In a press of the class described, the combination of a crank shaft, a friction clutch adapted to transmit power thereto, servo mechanism for securing high pressure engagement of said clutch, a brake on said crank shaft, and one-cycle stop mechanism comprising a control member operative to rotate with said clutch but arranged to have its rotation interrupted relatively thereto in releasing said clutch, said one-cycle stop mechanism governing said friction clutch and automatically engaging and releasing said brake.

10. The combination with a friction clutch comprising driving and driven clutch elements adapted to transmit power to a rotary driven member, one of said clutch elements being movable into and out of clutch engaging position, of spring means tending to move said latter element into clutch engaging position, ball-cam mechanism comprisng a rotatable cam ring having inclined cam pockets therein and balls engaging in said cam pockets, said ball-cam mechanism controlling the movement of said latter clutch element, a stop shoulder rotating with said cam ring, a releasable stop arm adapted to coact with said stop shoulder to interrupt the rotation of said cam ring, a brake drum rotating with said rotary driven member, releasable brake means coacting therewith, and control means adapted to release said stop arm and said brake means.

11. The combination with a friction clutch comprising driving and driven clutch elements adapted to transmit power to a rotary driven member, one of said clutch elements being movable into and out of clutch engaging position, of spring means tending to move said latter element into clutch engaging position, ball-cam mechanism comprising a rotatable cam ring having inclined cam pockets therein and balls engaging in said cam pockets, said ball-cam mechanism controlling the movement of said latter clutch element, a stop shoulder rotating with said cam ring, a releasable stop arm adapted to coact with said stop shoulder to interrupt the rotation of said cam ring, a brake drum rotating with said rotary driven member, releasable brake means coacting therewith, control means adapted to release said stop arm and said brake means, and supplementary cam mechanism for utomatically maintaining said brake means released for a predetermined degree of rotation of said rotary driven member.

12. The combination with a friction clutch comprising driving and driven clutch elements adapted to transmit power to a rotary driven member, said driven clutch element being movable into and out of clutch engaging position, of ball-cam mechanism controlling said movement of the latter clutch element, said ball-cam mechanism comprising a rotatable cam ring having inclined cam pockets therein and balls engaging in said cam pockets, a brake drum rotating with said cam ring, and releasable brake means controlling said cam ring through said brake drum.

13. The combination with a friction clutch comprising driving and driven clutch elements adapted to transmit power to a rotary driven member, one of said clutch elements being movable into and out of clutch engaging position, of spring means tending to move said latter element into clutch engaging position, ball-cam mechanism comprising a rotatable cam ring having inclined cam pockets therein and balls engaging in said cam pockets, said ball-cam mechanism controlling said movement of the latter clutch element, a main brake drum rotating with said rotary driven member, a supplementary brake drum rotating with said cam ring, and releasable brake means coacting in timed relation with both of said brake drums.

14. In combination, a pair of coacting frictional members, one of said members being shiftable into and out of engagement with the other member, and ball-cam mechanism for effecting shifting movement of said latter member, said ball-cam mechanism comprising two cam rings, balls between said rings, and cam pockets in the opposing faces of said rings accommodating said balls, said pockets being formed along chord lines with respect to the axis of said rings.

15. In clutch mechanism of the class described, the combination of a shiftable clutch element, a rotary element, a first set of struts pivotally mounted between said elements to transmit torque from one element to the other during one direction of rotation, a second set of struts pivotally mounted between said elements and including spring means tending to cause relative rotation between said elements, one-cycle stop mechanism controlling the engaging and releasing of the clutch comprising a pair of rings having cam-shaped runways in their adjacent surfaces, balls disposed between said rings for engaging with said runways, one of said rings being rotatable and shiftable with said shiftable clutch element, the other of said rings being rotatable, releasable stop means controlling the rotation of said latter ring, a brake band preventing reverse rotation of said rotary element, and manual actuating means for transmitting releasing motion to said brake band and to said stop means for releasing said brake band substantially concurrently with the release of said stop means.

16. In clutch mechanism of the class described, the combination of a shiftable clutch element, a rotary element, toggle struts pivotally mounted between said elements to transmit substantially the entire clutch load from one element to the other and reacting to said load by the exertion of a shifting force on said shiftable clutch element, one-cycle stop mechanism controlling the engaging and releasing of the clutch comprising a pair of rings having cam-shaped runways in their adjacent surfaces, balls disposed between said rings and engaging with said runways, one of said rings being rotatable and shiftable with said shiftable clutch element, the other of said rings being rotatable, holding means for preventing rotation of said latter ring in one direction and of said rotary element in the opposite direction, and means for releasing said holding means.

17. In clutch mechanism of the class described, the combination of a shiftable clutch element, a rotary element, a first set of toggle struts pivotally mounted between said elements to transmit torque from one element to the other during one direction of rotation, a second set of struts pivotally mounted between said elements and including spring means tending to cause relative rotation between said elements, said second set of struts operating to transmit torque from one element to the other during the opposite direction of rotation, one-cycle stop mechanism controlling the engaging and releasing of the clutch comprising a pair of rings having cam-shaped runways in their adjacent surfaces, balls disposed between said rings and engaging with said runways, one of said rings being rotatable and shiftable with said shiftable clutch element, the other of said rings being rotatable, holding mechanism for normally preventing rotation of said latter ring in a forward direction of motion and for normally preventing rotation of said rotary element in a rearward direction of motion, and control means coacting with said holding mechanism for releasing said latter ring and said rotary element substantially simultaneously.

18. The combination with a clutch comprising driving and driven clutch elements, of torque responsive servo mechanism mounted coaxially of said clutch elements and operative to transmit engaging pressure to said clutch, separate torque responsive release mechanism mounted coaxially of said clutch elements and operative to transmit releasing pressure to said clutch, and friction brake means mounted coaxially of said clutch elements and governing the operation of said torque responsive release mechanism.

19. The combination with a clutch comprising driving and driven clutch elements, or torque responsive servo mechanism operative to transmit engaging pressure to said clutch, torque responsive release mechanism operative to transmit releasing pressure to said clutch, and friction brake means governing the operation of said release mechanism.

20. The combination with a rotary driving member and a rotary driven member, of a clutch for coupling said members together comprising driving and driven clutch elements, torque responsive servo mechanism operative to transmit engaging pressure to said clutch, torque responsive release mechanism operative to transmit releasing pressure to said clutch, and controllable brake means governing the operation of said release mechanism and exerting braking force on said rotary driven member.

21. The combination with a rotary driving member and a rotary driven member, of a clutch for coupling said members together comprising driving and driven clutch elements, torque responsive servo mechanism operative to transmit engaging pressure to said clutch, torque responsive release mechanism operative to transmit releasing pressure to said clutch, and controllable friction brake mechanism governing the operation of said release mechanism and holding said rotary driven member against motion after said clutch has been released.

22. The combination with a rotary driving member and a rotary driven member, of a clutch for coupling said members together comprising driving and driven clutch elements, one of which is shiftable, torque responsive servo mechanism operative to transmit shifting pressure to said shiftable clutch element in a clutch engaging direction, torque responsive release mechanism operative to transmit shifting pressure to said shiftable clutch element in a clutch releasing direction, and controllable brake mechanism governing the operation of said release mechanism and holding said rotary driven member against motion after said clutch has been released.

23. The combination with a rotary driving member and a rotary driven member, of a friction clutch for coupling said members together comprising driving and driven friction clutch elements, said driven clutch element being shiftable into and out of clutching engagement with said driving clutch element, means for effecting initial engagement of said clutch, torque responsive servo mechanism operative to transmit shifting pressure to said shiftable clutch element in a clutch engaging direction for increasing the pressure of engagement of the clutch, torque responsive release mechanism operative to transmit shifting pressure to said shiftable clutch element in the opposite direction for releasing the clutch, and manually controllable friction brake mechanism comprising brake drum means and brake shoe means operative when engaged to cause said release mechanism to release said clutch, and substantially simultaneously therewith to apply braking retardation to said rotary driven member for holding said driven member against rotation after the clutch is released.

24. The combination with a rotary driving member and a rotary driven member, of a clutch for coupling said members together comprising driving and driven clutch elements, and clutch control mechanism comprising a rotary control member normally rotating with the clutch when the latter is engaged but capable of being retarded relatively thereto, means responsive to such retardation of said rotary control member for releasing the clutch, and brake mechanism operative to impose frictional braking retardation on said rotary control member and on said rotary driven member.

25. In a clutch, the combination of a first rotatable clutch part movable axially into and out of engagement with a second rotatable clutch part, toggle strut servo mechanism for effecting high pressure engagement between said clutch parts, a shaft to which said first clutch part is connected, a member rotatable relatively to said first clutch part, cooperating means between said member and said first clutch part, including an inclined surface on said member, and a rotatable member riding on said inclined surface and acting on said first clutch part to move it axially when the rotation of said member is interrupted and said first clutch part is rotating, means to interrupt the rotation of said member including a lug on said member, an arm swingable into the path of said lug, a brake band encircling said shaft and operable thereon to stop rotation thereof and through it the rotation of said first clutch part, means to actuate said brake band to stop rotation of said shaft, releasable means to retain said brake band actuating means inoperative, and common manually operable means to swing said arm and to release said retaining means for said brake band actuating means.

26. In a clutch, the combination of a first rotatable clutch part movable axially into and out of engagement with a second rotatable clutch part, toggle strut servo mechanism for effecting high pressure engagement between said clutch parts, a member rotatable relatively to said first clutch part, cooperating means between said member and said first clutch part operable when the rotation of said member is interrupted and the said first clutch part is rotating to axially move said first clutch part, and common brake means adapted to stop the rotation of said member and said first clutch part.

27. In a clutch, the combination of cooperating driving and driven clutch elements, one of said clutch elements being controllable for engaging and releasing the clutch, torque responsive servo mechanism for actuating said controllable clutch element in one direction, torque responsive servo mechanism for actuating said controllable clutch element in the other direction, and controllable brake means governing one of said servo mechanisms.

28. In a clutch, the combination of cooperating driving and driven clutch elements, one of said clutch elements being controllable for engaging and releasing the clutch, toggle strut servo mechanism for actuating said controllable clutch element in one direction, torque responsive servo mechanism for actuating said controllable clutch element in the other direction, and friction brake means controlling one of said servo mechanisms.

29. In a clutch, the combination of cooperating driving and driven clutch elements, one of said clutch elements being controllable for engaging and releasing the clutch, torque responsive servo mechanism for actuating said controllable clutch element in one direction, ball-cam torque responsive servo mechanism for actuating said controllable clutch element in the other direction, and controllable brake means governing one of said servo mechanisms.

30. In a clutch for transmitting rotation to a rotary driven member, the combination of cooperating driving and driven clutch elements, said driven clutch element being shiftable into and out of clutching engagement with said driving clutch element, spring means for shifting said driven clutch element into clutching engagement, ball-cam mechanism acting between said rotary driven member and said driven clutch element for shifting said driven clutch element out of clutching engagement, and friction brake means controlling said ball-cam mechanism.

31. In a clutch, the combination of cooperating driving and driven friction clutch elements, said driven clutch element being shiftable into and out of clutching engagement with said driving clutch element, torque responsive servo mechanism for shifting said driven clutch element into clutching engagement with said driving clutch element, ball-cam mechanism for shifting said driven clutch element out of clutching engagement with said driving clutch element, said ball-cam mechanism being arranged whereby it comes to rest along with said driven clutch element upon disengagement of the clutch independently of continued rotation of said driving clutch element, and friction brake mechanism controlling said ball-cam mechanism.

32. In a clutch for transmitting rotation to a rotary driven member, the combination of a driving clutch element, a shiftable driven clutch element, spring means normally tending to shift said driven clutch element into clutching engagement with said driving clutch element, servo releasing mechanism comprising a cam slope and a rotary device rolling along said slope and acting between said rotary driven member and said driven clutch element for shifting said driven clutch element to a clutch releasing position, said servo releasing mechanism coming to rest along with said rotary driven member when the clutch is released, independently of continued rotation of said driving clutch element, and controllable brake mechanism for controlling said servo releasing mechanism.

33. In a clutch for transmitting rotation to a rotary driven member, the combination of a driving clutch element, a shiftable driven clutch element, spring means normally tending to shift said driven clutch element into clutching engagement with said driving clutch element, clutch releasing mechanism acting between said rotary driven member and said driven clutch element, said clutch releasing mechanism comprising a pair of thrusting members, one of which has inclined cam tracks, and rotary devices having rolling contact between sad members and along said cam tracks for exerting a separating force between said thrusting members to shift said driven clutch element to clutch releasing position, said thrusting members and said rotary devices coming to rest along with said rotary driven member when the clutch is released, independently of continued rotation of said driving clutch element, and friction brake means acting on one of said thrusting members.

CLARENCE M. EASON.

CERTIFICATE OF CORRECTION.

Patent No. 2,308,680.　　　　　　　　　　　　　　　January 19, 1943.

CLARENCE M. EASON

It is hereby certified that error appears in the printed specification of the above numbered patent requiring correction as follows: Page 8, first column, line 4, claim 4, for "wtih" read --with--; page 8, second column, lines 33 and 34, claim 11, for "utomatically" read --automatically--; page 9, second column, line 7, claim 19, for "or" read --of--; page 10, second column, line 62, claim 33, for "sad" read --said--; and that the said Letters Patent should be read with this correction therein that the same may conform to the record of the case in the Patent Office.

Signed and sealed this 16th day of March, A. D. 1943.

(Seal)

Henry Van Arsdale,
　　　　　　　　　　　　　　　　　　Acting Commissioner of Patents.